United States Patent [19]

Karasawa et al.

[11] Patent Number: 4,477,045
[45] Date of Patent: Oct. 16, 1984

[54] METHOD OF CONTROLLING A SELF-LEVELLING DEVICE

[75] Inventors: Kohichi Karasawa; Takeo Itoh; Humihito Koizumi, all of Sagamihara; Kimio Uchida, Yokohama, all of Japan

[73] Assignee: Showa Electric Wire & Cable Co., Ltd., Kawasaki, Japan

[21] Appl. No.: 313,210

[22] Filed: Oct. 20, 1981

[30] Foreign Application Priority Data

Oct. 23, 1980 [JP] Japan .................. 55-148829
Oct. 9, 1981 [JP] Japan .................. 56-161177

[51] Int. Cl.³ ............................................. F16M 13/00
[52] U.S. Cl. .................................... 248/1; 248/550; 108/144; 108/136
[58] Field of Search ............... 248/550, 1, 631, 188.3, 248/59; 108/144, 147, 136

[56] References Cited

U.S. PATENT DOCUMENTS 2,956,761 10/1960 Weber .......................... 248/550
3,730,473 5/1973 Pepi ............................. 248/550
4,057,212 11/1977 Schubert ....................... 248/550
4,336,917 6/1982 Phillips ........................ 248/562

FOREIGN PATENT DOCUMENTS 414381 7/1974 U.S.S.R. ........................ 248/550

Primary Examiner—Reinaldo P. Machado
Assistant Examiner—Alvin Chin-Shue
Attorney, Agent, or Firm—Kenway & Jenney

[57] ABSTRACT

There is disclosed a method of controlling the level of a self-levelling device comprising a table to be controlled in level, an air spring supporting the table, a sensor for contactless detection of an amount of displacement of the table from a reference position, an inlet valve for supplying air under pressure to the air spring through an inlet port therein, and an outlet valve for discharging air from the air spring through an outlet port therein. An interval of time for actuating the inlet valve and/or the outlet valve to return the table to the reference position is computed from the amount by which the table is displaced. The inlet and/or outlet valve is then actuated for the calculated interval of time to adjust the table level through the air spring.

5 Claims, 19 Drawing Figures

METHOD OF CONTROLLING A SELF-LEVELLING DEVICE

BACKGROUND OF THE INVENTION

1. Field of the Invention

The present invention relates to a method of controlling a self-levelling device by supplying air to or discharging air from an air spring supporting a table on which a machine is mounted, for maintaining the table at a reference position.

2. Prior Art

Various precision machines or apparatus such for example as optical devices, precision measurement instruments, apparatus for fabricating ICs, and electron microscopes are susceptible to slight vibrations or displacements while in operation, and tend to malfunction or yield defective products when under vibratory conditions. To isolate such vibrations, it has been proposed to place a machine 1 (FIG. 1 of the accompanying drawings) on a self-levelling device on vibration isolation device 2 by a table 3 supported on an air spring. As disclosed in U.S. Pat. Nos. 2,956,761; 3,115,944; 3,730,473; and 4,057,212, the air spring has a valve openable and closable to admit air into or discharge air from the air spring in response to an amount of displacement of the table from a reference position, as detected by a plunger held in contact with the underside of the table. When the valve is actuated, the air spring causes the table to move upwardly or downwardly for correction of the level of the table.

The prior vibration isolation devices include a complex mechanism for isolating the displacement-detecting plunger from vibrations from the floor. Nevertheless, the table is still subjected to some types of vibrations transmitted through the plunger. When the table is displaced widely from the reference position, the plunger is also moved a large distance causing an increased amount of air to be supplied to the air spring, whereupon the table position is corrected relatively rapidly. When the amount of displacement of the table is relatively small, the valve opens slightly and the table is caused to return to its reference position in a longer period of time.

SUMMARY OF THE INVENTION

The above-described drawbacks in the prior art apparatus have been successfully eliminated by the present invention.

It is a first object of the present invention to provide a method of controlling a self-levelling device by actuating an air spring through contactless detection of displacements of a table.

A second object of the present invention is to provide a method of controlling a self-levelling device by adjusting the level of a table when the latter is subjected to varying loads or weights of a machine supported thereon.

A third object of the present invention is to provide a method of controlling a self-levelling device with an increased degree of precision.

A fourth object of the present invention is to provide a method of controlling a self-levelling device to return a table thereof to a reference position at a high speed.

According to the present invention, there is provided a method of controlling the level of a self-levelling device comprising a table to be controlled in level, an air spring supporting the table, a sensor for contactless detection of an amount of displacement of the table from a reference position, an inlet valve for supplying air under pressure to the air spring through an inlet port therein, and an outlet valve for discharging air from the air spring through an outlet port therein. An interval of time for actuating the inlet valve and/or the outlet valve to return the table to the reference position is computed from the amount by which the table is displaced. The inlet valve and/or outlet valve is then actuated for the calculated interval of time to adjust the level of the table through the air spring.

In a preferred embodiment of the present invention, amounts of upward movement and downward movement of the table are measured which corresponds to a predetermined period of time during which the inlet and outlet valves are actuated while the self-levelling device is in operation. A controller stores data on the widths of pulses for moving the table upwardly and downwardly by unit distances on the basis of a relationship between the amounts of upward and downward movement of the table. The table is displaced through increments of unit distances by actuating the inlet valve in response to intermittent application of pulses for moving the table upwardly or by actuating the outlet valve in response to intermittent application of pulses for moving the table downwardly.

These and other objects of the invention will become apparent from the following description of embodiments thereof when taken together with the drawings.

DETAILED DESCRIPTION OF THE PREFERRED EMBODIMENTS

Figure 1:
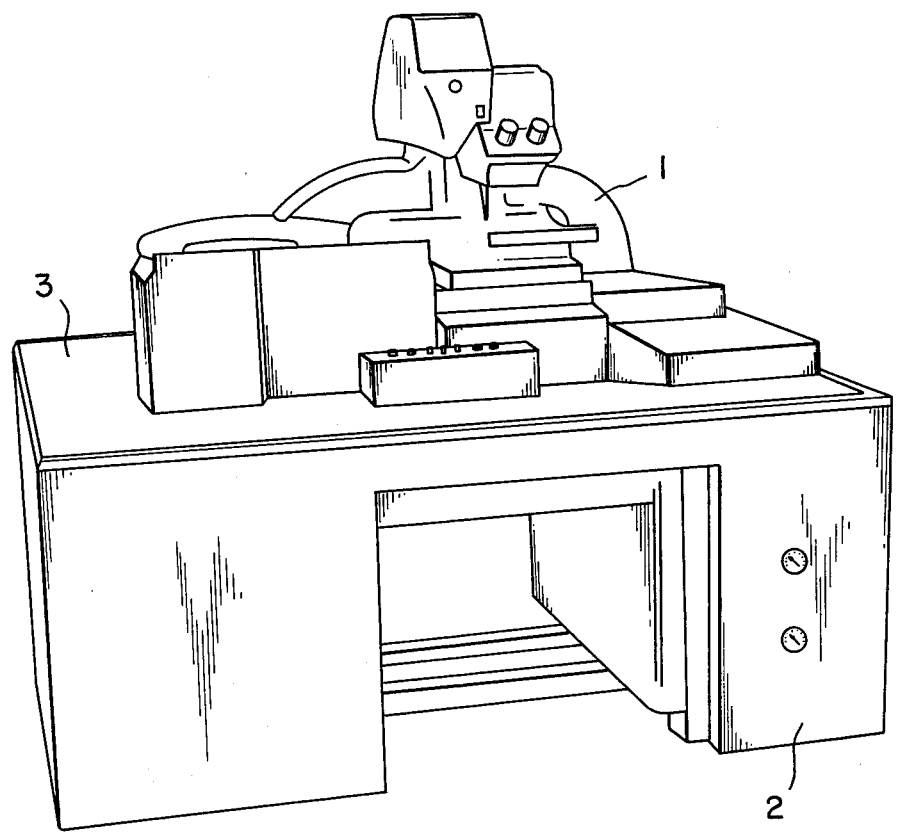
FIG. 1 is a view showing a conventional self-levelling device.
Figure 2:
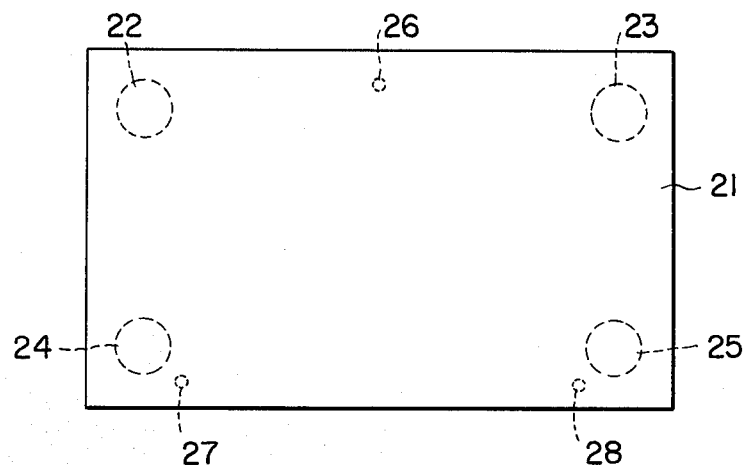
FIG. 2 is a plan view of a self-levelling device controllable by a method of the present invention.

As shown in FIG. 2, a table 21 of a self-levelling device controllable by a method of the present invention is supported at its four corners by air springs 22, 23, 24, and 25. Three sensors 26, 27, and 28 are disposed below the table 21 for measuring amounts of displacement or deviation of the table 21 from a reference position.

Figure 3:
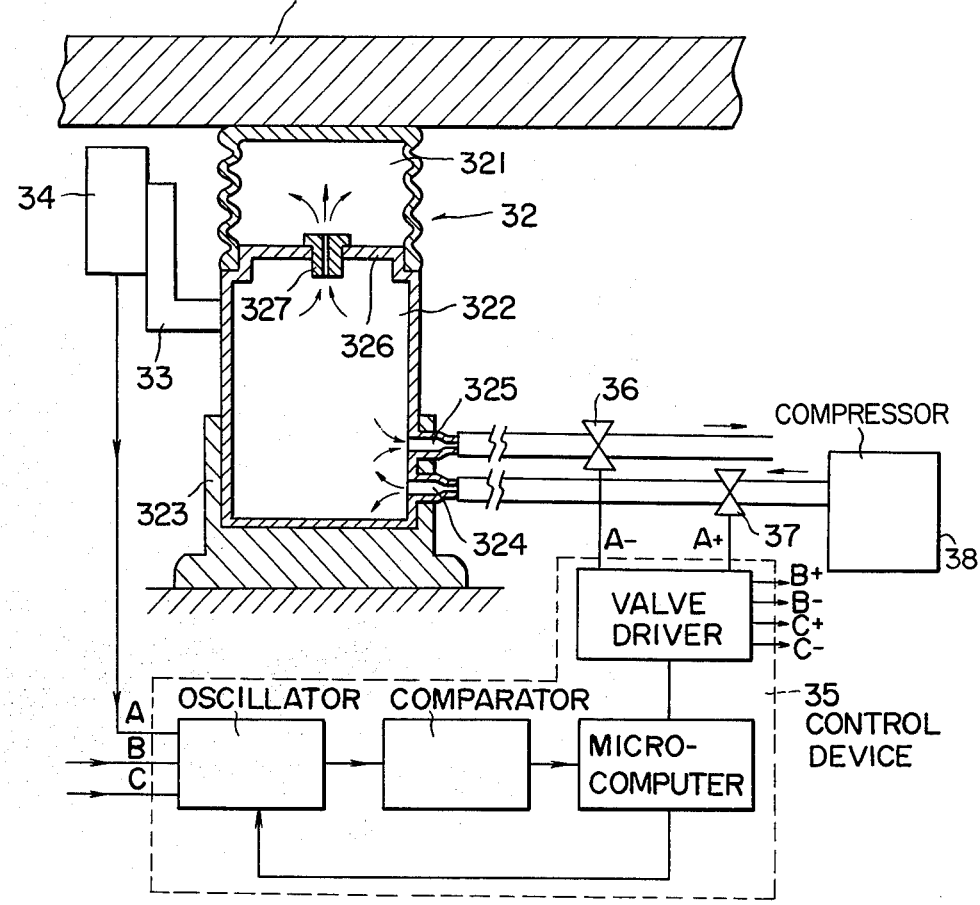
FIG. 3 is a fragmentary cross-sectional view of a table, a sensor and an air spring of the self-levelling device of FIG. 2, the view being also illustrative of principles of levelling of the table.

In FIG. 3, the table 21 is shown as supported by one of such sensors 32 which comprises a diaphragm or bellows 321 held against the underside of the table 21, an air chamber 322 supporting the diaphragm 321, and a leg 323 supporting the air chamber 322. The air chamber 322 has an inlet port 324 for supplying air under pressure into the air chamber 322, and an outlet port 325 for discharging air out of the air chamber 322. The air chamber 322 also includes a partition 326 on which the diaphragm 321 is mounted, the partition 326 having an orifice 327 extending therethrough which has a predetermined diameter.

An arm 33 projects laterally from the air chamber 332 and has on its upper end one of the sensors 34 spaced a predetermined distance from the lower surface of the table 21. As described later on, the sensor 34 serves to measure a distance between an upper surface of the sensor 34 and the lower surface of the table 21 to a nicety and to deliver information or data as to the measured distance to a control device or controller 35. The controller 35 is responsive to such information supplied for determining whether to raise or lower the table 21 and for actuating an outlet valve 36 connected to the outlet port 325 or an inlet valve 37 connected to the inlet port 324. When the outlet valve 36 is opened, air is discharged from the air chamber 322 allowing the diaphragm 321 to collapse, whereupon the table 21 is lowered. Conversely, when the inlet valve 37 is opened, air under pressure is supplied from a compressor 38 into the air chamber 322 through the inlet port 324 and thence through the orifice 327 to inflate the diaphragm 321, thus forcing the table 21 to move upwardly.

Such operation is effected by the four air springs to keep the table spaced a predetermined level from a floor or base above which the table is disposed.

Figure 4:
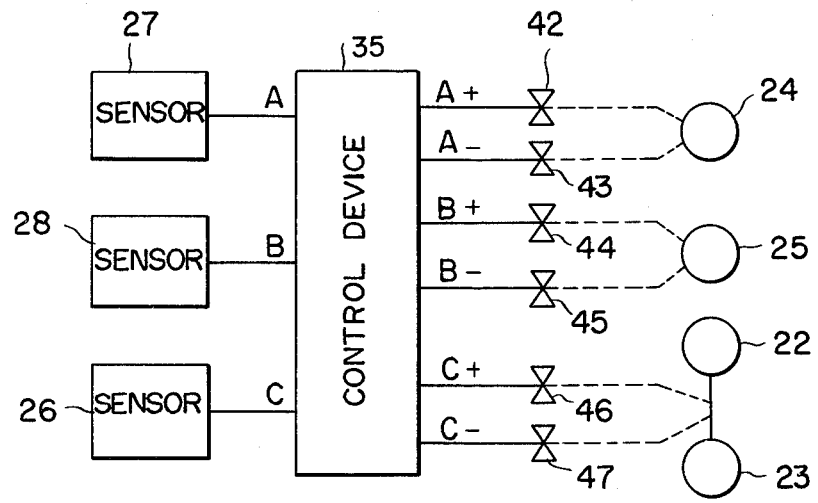
FIG. 4 is a block diagram of an arrangement for controlling four air springs as shown in FIG. 2 with three sensors.

In FIG. 4, in which corresponding parts are denoted by corresponding reference numbers in FIG. 2, the sensor 27 supplied information A indicative of an amount of displacement of the table to the controller 35, which generates pulses A+ and A− for upward and downward movement of the table which are needed for table level adjustment. The pulses are applied to an inlet or outlet valve 42 or 43 to open the selected valve to actuate the air spring 24. The sensor 27 operates in the same way as described above. The sensor 26 serves to detect amounts of displacement of the table at a position midway between the air springs 22, 23 and to cause the controller 35 to produce pulses C+ or C− based on information or data on a detected deviation for actuating the air springs 22, 23 simultaneously to raise or lower the table. To this end, the air chambers of the air springs 22, 23 are held in fluid communication with each other and connected to a common inlet valve and a common outlet valve.

Detection by the sensors of amounts of deviation of the table, and the way in which the table is caused to return from a displaced position will now be described in more detail.

Figure 5:
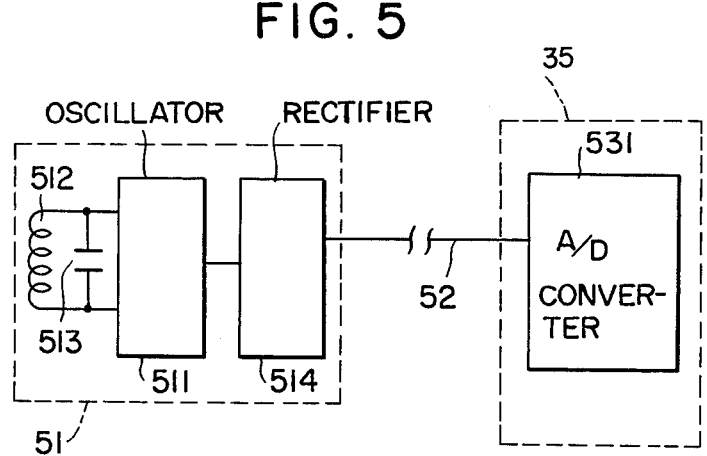
FIG. 5 is a block diagram of a sensor.

In FIG. 5, one of the sensors described 51 comprises an oscillator 511, a resonance circuit composed of a coil 512 and a capacitor 513 connected in parallel for being supplied with an oscillating current from the oscillator 511, and a rectifier 514 for rectifying a current from the resonance circuit into a direct current. An output from the rectifier 514 is delivered over a signal transmission cable 52 to an A/D converter 531 in the controller 35.

The sensor 51 will operate as follows: The oscillator 511 is energized to produce a signal having a frequency of about 200 KHz and deliver an oscillating current to the resonance circuit, in which the coil 512 may have an inductance of 200 $\mu$H and the capacitor 513 a capacitance of 0.01 $\mu$F, for example.

Figure 6:
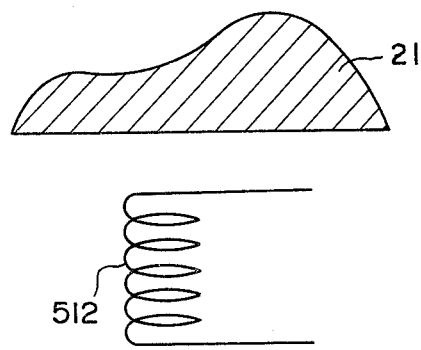
FIG. 6 is a fragmentary cross-sectional view of the table as positionally related to a sensor coil.
Figure 7:
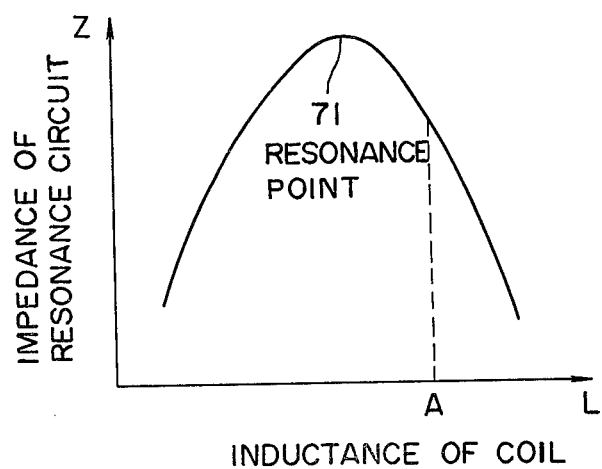
FIG. 7 is a graph showing a curve of the impedance of a resonance circuit plotted against variations in the inductance of the sensor coil which defines the impedance.

As shown in FIG. 6, the coil 512 is disposed adjacent to the lower surface of the table 21, which is made of magnetic material, or alternatively to a magnetic plate (not shown) attached to the underside of the table 21. When the table 21 moves upwardly or downwardly, the impedance of the coil 62 varies. The impedance, shown at Z in FIG. 7, of the resonance circuit varies along a curve as shown in FIG. 7 as the inductance L of the coil 512 changes, the curve being symmetrical with the maximum value at a resonance point 71 at the frequency of 200 KHz. By determining circuit constants so that the inductance L will take a value at the point A when the coil 512 is spaced from the table 21 by 100 mm, the impedance of the resonance circuit will be increased as the table 21 moves upwardly, and will be reduced as the table 21 moves downwardly. When a constant oscillating voltage of 200 KHz is applied to the resonance circuit, a current flowing in the circuit is variable linearly, and a signal obtained by rectifying the current corresponds to a displacement of the table. An experiment with the illustrated sensor indicated that the rectifier 514 produced a dc output voltage of 2.5 V when the table 21 and the coil 512 were spaced 10 mm from each other, and produced a dc output of 0.5 V when the distance is 15 mm between the table 21 and the coil 512. Thus, the sensor can detect amounts of displacement of the table 21 distinctly. Since only a dc voltage is applied to the signal transmission cable 52 connected to the controller 35 as shown in FIG. 5, the arrangement of the invention is highly resistant to noise signals.

Performances required of self-levelling devices are dependent upon their applications. A displacement of a table by about 20 $\mu$ can be detected by converting a dc voltage of about 0 to 5 V from the sensor into a corresponding digital signal.

The controller for processing sensor outputs to control the valves for their opening and closing operation will be described in more detail with reference to FIG. 8.

The controller converts a dc output voltage signal A from a sensor 801 into a digital signal through an A/D converter 802, and delivers such a digital signal over a bus line 804 under a command from a CPU 803. To the bus line 804, there are connected ROMs 805 in which a program is written, a RAM 806 in which control constants are stored, and an I/O port 807 for generating outputs for controlling valves. The CPU 803 compares data from the sensor 801 with data indicative of a reference position in which the table is to be located, determines whether to open an outlet valve 809 or an inlet valve 800, and produces as output pulses A+ or A− for moving the table upwardly or downwardly. Driver circuits 810, 811 are energized by such upward or downward movement pulses A+ or A− for selective application of a voltage as of 24 V to actuate the outlet valve 809 or the inlet valve 808. The drivers 810, 811 may be in the form of switching circuits comprising known transistors.

Figure 8:
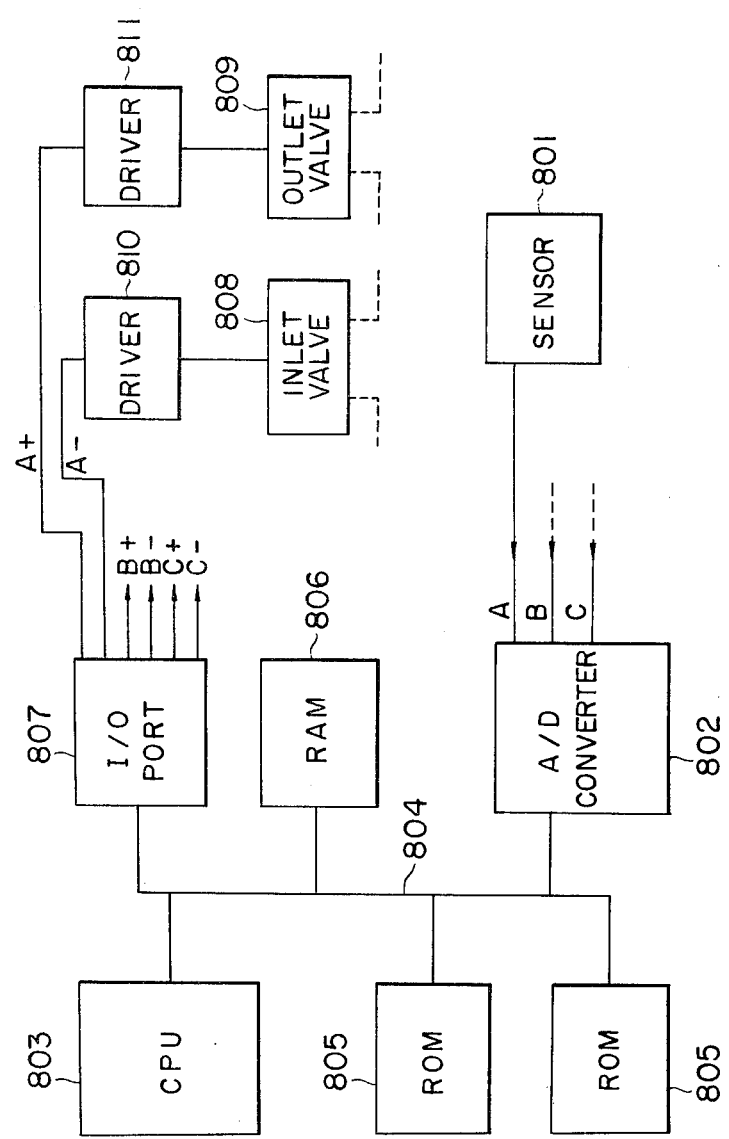
FIG. 8 is a block diagram of a controller for controlling valves, such a sensor.
Figure 9:
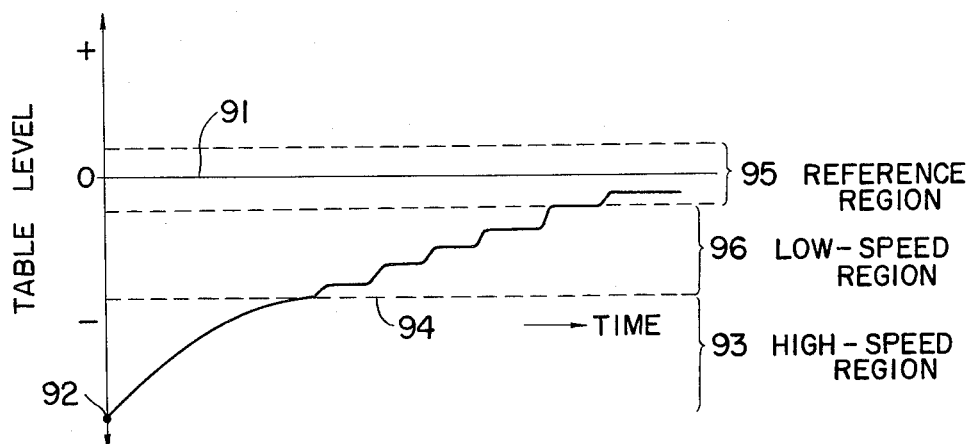
FIG. 9 is a graph showing a relationship between time and variations in table level which is controllable by the controller shown in FIG. 8.
Figure 10:
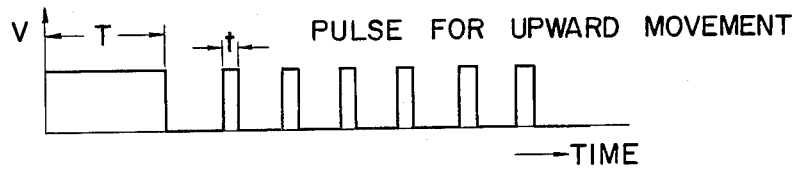
FIG. 10 is a diagram illustrative of pulses applied to the inlet valve for raising the table according to the level variations shown in FIG. 9.

FIGS. 9 and 10 are illustrative of the way in which the controller shown in FIG. 8 is employed to lift the table from a position 92 below a reference position 91 into a reference region 95 with the reference position 91 therein, in which no level adjustment is necessary.

The table is initially in the position 92 as shown in FIG. 9. When the inlet valve is actuated to be open continuously for a period of 5 sec., as illustrated in FIG. 10, the table is raised to an upper edge 94 of a high-speed region 93. The table moves at a lower speed in a low-speed region 96 above the high-speed region 93 to prevent hunting. To this end, the inlet valve is opened for intermittent intervals of time each comprising t sec. until the table enters the reference region 95, whereupon the inlet valve is de-energized.

With the two different table-lifting speed regions, the table can move upwardly smoothly into the desired reference region without hunting.

Figure 11:
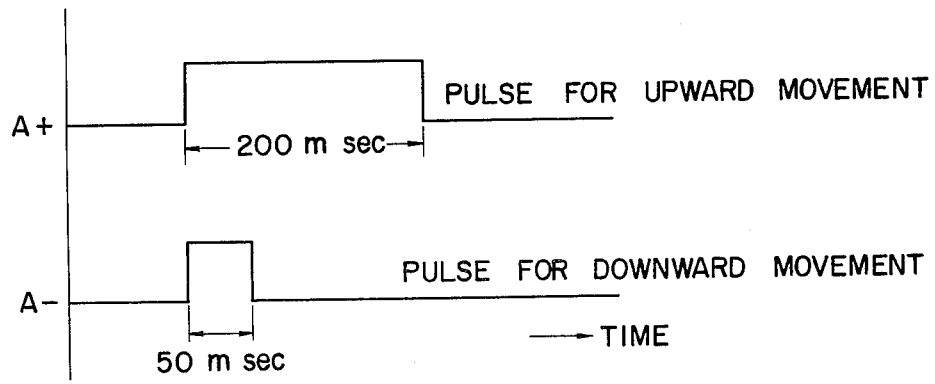
FIG. 11 shows pulses for moving the table upwardly and downwardly for equal distances.

An experiment indicated that with a machine on the table having a weight of 120 kg, and the air chambers of the air springs being pressurized at 3 kg/cm$^2$, when the inlet valves were opened by an upward movement pulse A+ for 200 msec. as shown in FIG. 11, the table was raised 400 $\mu$m, and when the outlet valve was opened by a downward movement pulse A− for two msec., the table was lowered 400 $\mu$m.

As the weight of the machine on the table bears directly on the air springs, the inlet and outlet valves will be actuated in different intervals of time to displace the table upwardly and downwardly for equal distances. Such intervals of time will vary with loads imposed on the table. For controlling the table level, it is preferable that a unit amount of upward or downward movement of the table, or a unit driven distance therefor, be constant which corresponds to a single period of time in which the valve is actuated in the low-speed region. According to the present invention, a test pulse is applied to the inlet and outlet valves while the table is in use, and amounts of upward and downward movement of the table are measured which is caused by the application of the pulse. Data thus obtained is employed to compute intervals of time in which the valves are to be operated and which correspond to unit distances for which to move the table. The computed intervals of time are stored as data on constants in the RAM 806 of the controller as shown in FIG. 8.

Figure 12:
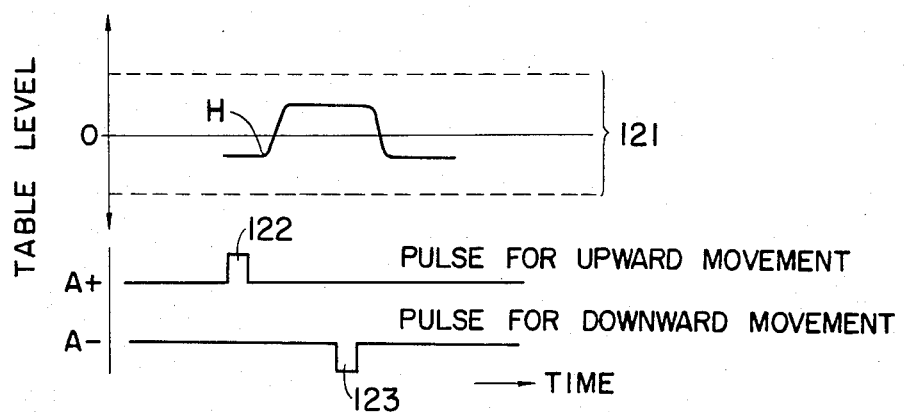
FIG. 12 shows variations in table level which correspond to pulses applied for upward and downward movement of the table.

FIG. 12 shows variations in the level of the table which occur when determining such constants. When the table is at rest in a reference region 121, an upward movement pulse 122 indicated at A+ is applied to raise the table for one step or increment as shown by the curve H, thereby measuring a change in the table level. The width of a pulse for moving the table upwardly through a unit distance is computed from the width of the pulse 122 applied and the change in the table level. Then, a downward movement pulse 123 indicated at A− is applied to compute the width of a pulse for moving the table downwardly through a unit distance in a similar manner. Data on these pulse widths are stored in the RAM 806 shown in FIG. 8. Each time the CPU 803 delivers a command for moving the table upwardly or downwardly, the I/O port generates an upward movement pulse or a downward movement pulse for driving the table for a unit distance.

Such constant determining operation is performed as desired while the table is in use to determine suitable constants dependent upon the weight of a machine mounted on the table, that is, upon the condition in which the table is used.

With the foregoing arrangement, the table can be moved upwardly or downwardly by actuating the inlet or outlet valve with upward or downward movement pulses applied. In general, solenoid-operated valves will not be actuated unless the solenoid is supplied with a pulse over a predetermined period of time. For example, the inlet valve according to the present invention will be actuated when supplied with a pulse having a width of 50 msec. or more at dc 24 V. If the valve were opened for 50 msec. upon application of a pulse having a width of 50 msec., the table supporting a heavy machine thereon would be raised 100 $\mu$m and lowered 400 $\mu$m, for example. Therefore, where the reference region has a width of about 200 $\mu$m, the table would not be maintained stably in the reference region.

Figure 13:
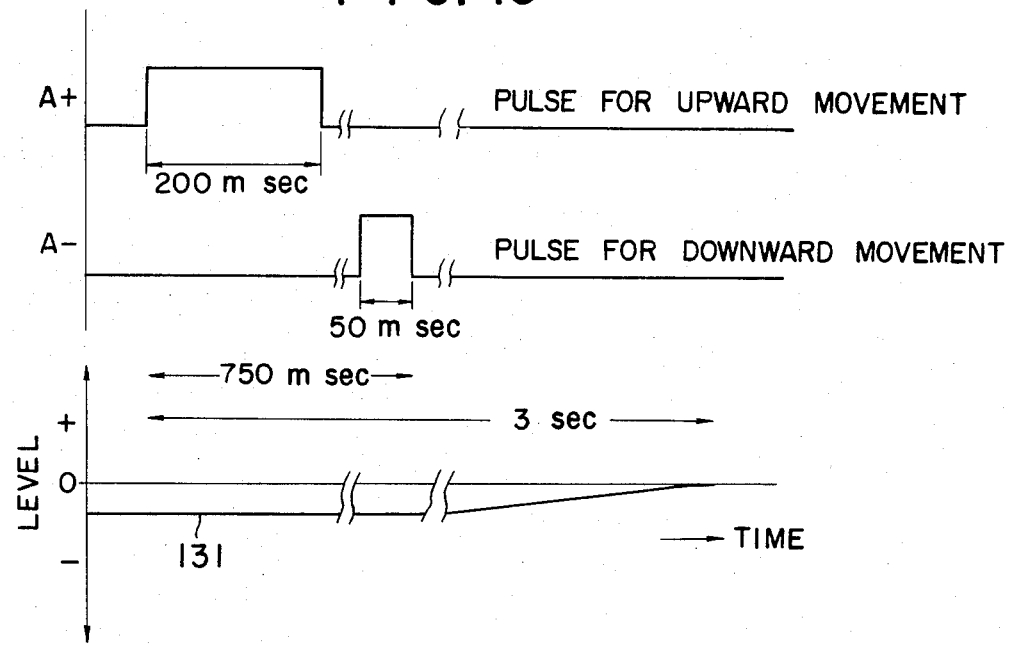
FIG. 13 illustrates variations in table level as controlled by combined pulses for upward and downward table movement.

To cope with such a problem, combined upward movement and downward movement pulses are applied as shown in FIG. 13 in accordance with the present invention. In FIG. 13, an upward movement pulse A+ is applied for 200 msec. to open the inlet valve for 200 msec., and upon elapse of 500 msec., a downward movement pulse A− is applied for 50 msec. to actuate the outlet valve for 50 msec. About 10 msec. will elapse after the controller has delivered such pulses and before the valves start being actuated. However, such a delayed response time is not large and is negligible, only the pulses being shown with no opening and closing of the valves indicated.

It will normally take about 3 sec. for air in the air chambers of the air springs to act to move the table upwardly or downwardly after the inlet or outlet valve has been actuated. When the inlet and outlet valves are actuated simultaneously or one after another after they have been previously actuated and before the table starts being raised, a total amount of air resulting from all operations of the valves will be introduced into and discharged from the air chambers. As a consequence, the table will simply be lifted, for example, for a slight distance as indicated by the curve 131 of FIG. 13, which would not otherwise be attained with actuation of either the inlet valve or the outlet valve. This mode of operation may be utilized to move the table for a unit driven distance as described above, thereby providing high-precision level adjustment.

Figure 14:
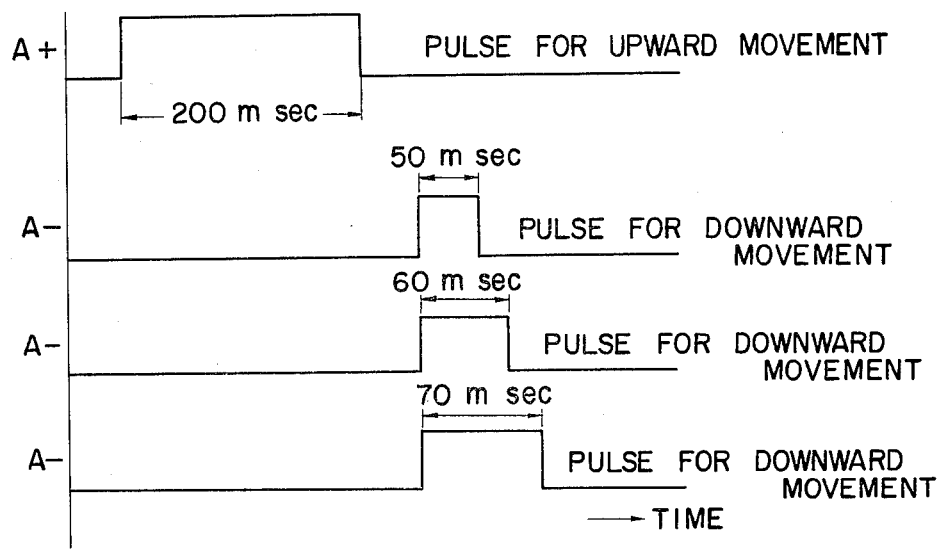
FIG. 14 shows a pulse for upward table movement and pulses to be combined therewith for downward table movement.

A control method as illustrated in FIG. 13, in order to be carried out, requires a process for finding an optimum combination of upward and downward movement pulses to be applied one after another with the widths thereof predetermined. Such a process will be described with reference to FIG. 14.

Figure 15:
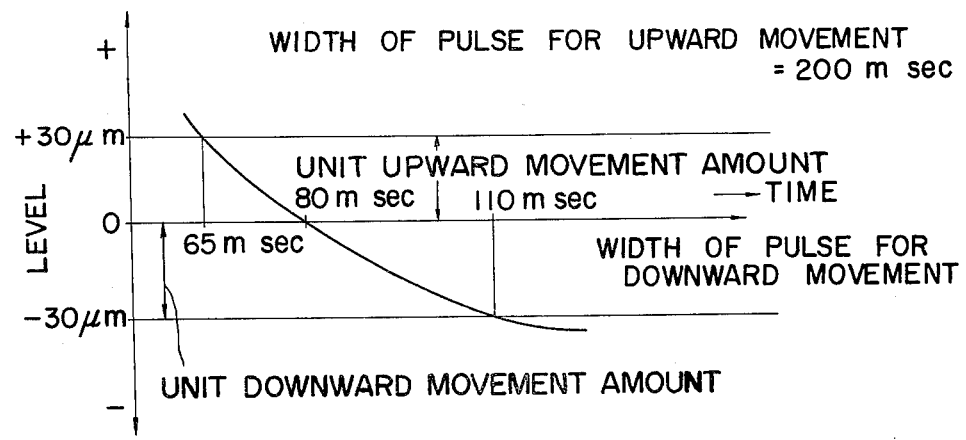
FIG. 15 is illustrative of variations in table level which are caused by pulse combinations shown in FIG. 14.

When the table is in the reference region while the self-levelling device is in operation, a pulse having a width of 200 msec. is produced for moving the table upwardly. Then, 300 msec. after such a pulse has been generated, a pulse having a width of 50 msec. is produced for lowering the table. The table is measured for an amount of displacement thereof which will take place about 3 sec. thereafter. A similar process will be repeated by applying downward movement pulses having increased widths, such as of 60 msec. and 70 msec. with the upward movement pulse remaining unchanged. Amounts of displacement of the table are plotted against widths of downward movement pulses as shown in FIG. 15. Theoretically, such a relationship as shown in FIG. 15 is utilized to actuate the outlet valve in a manner described above, thus enabling the table to be corrected in displacement regardless of response characteristics of the valve.

With the sensor as shown in FIG. 6 which the inventors produced on a trial basis, a measurable amount of displacement of the table had a limit of about 20 μm. A unit amount of upward movement of the table was 30 μm obtained by a combination of an upward movement pulse of 200 msec. and a downward movement pulse of 65 msec. A unit amount of downward movement of the table was 30 μm obtained by a combination of an upward movement pulse of 200 msec. and a downward movement pulse of 110 msec. Such unit amounts of upward and downward movement were employed for use in low-speed regions one on each side of the reference region. The series of operations is carried out under a program stored in the ROM 805 of the controller of FIG. 8 for determining pulse widths, by first changing the widths of downward movement pulses successively within a predetermined range with an upward movement pulse of a given width used as a parameter, comparing resulting variations in table level with data on unit driven distances previously stored in the ROM 805 to thereby select suitable pulse widths, and storing data as to such selected pulse widths in the RAM 806.

Figure 16:
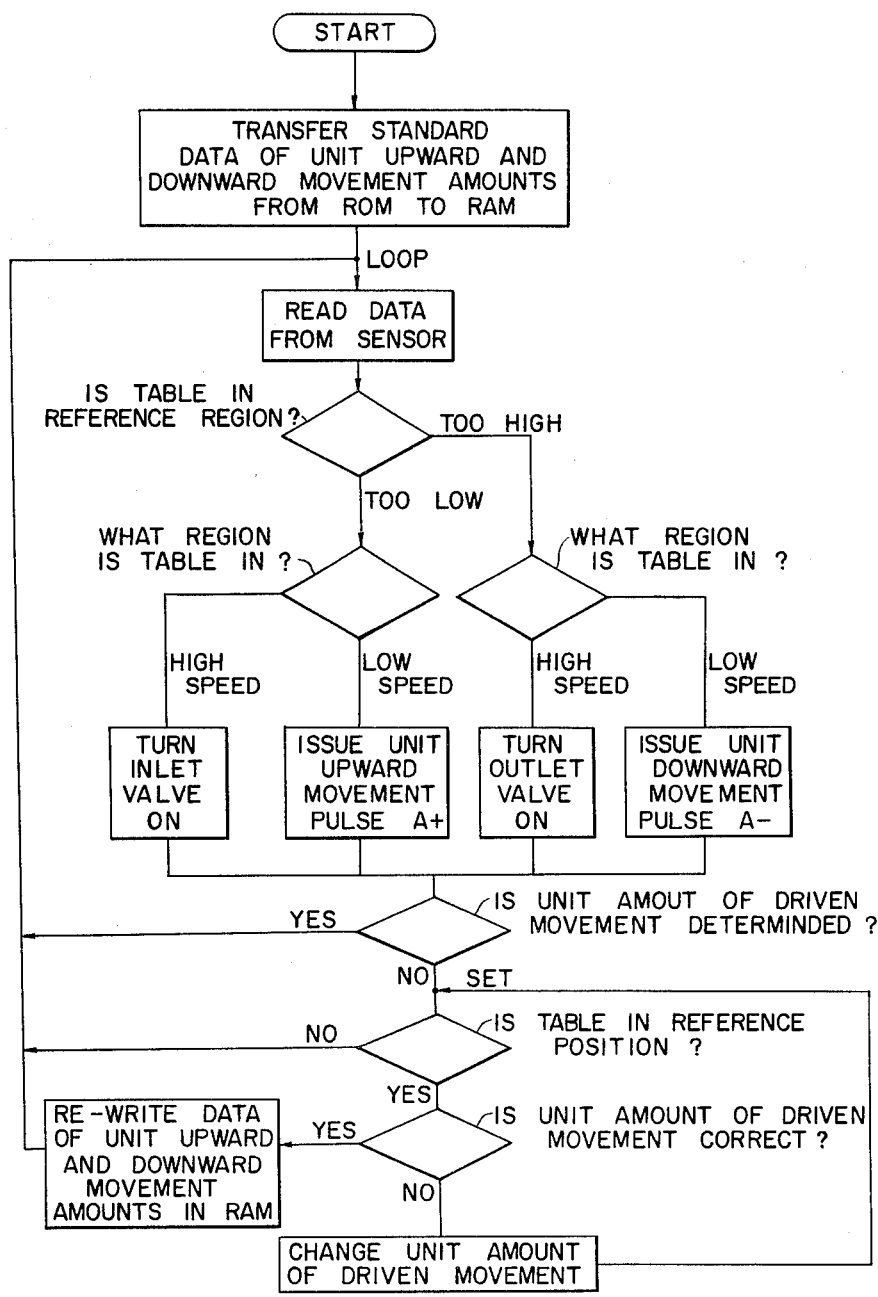
FIG. 16 is a program flowchart for operations of the controller.

FIG. 16 is a program flowchart for the controller, including the foregoing process. According to the illustrated program, the above process is carried out immediately before the self-levelling device is operated and after the controller has been turned on in order to start actuating the self-levelling device with a variety of machines placed on the table.

The program flowchart will be described with reference to FIG. 8. When a power supply for the controller is switched on, the program written in the ROM 805 starts being executed, whereupon data on the lengths of upward and downward movement pulses corresponding to unit amounts of upward and downward movement of the table are transferred from the ROM 805 in which the data have been written as standard values to the RAM. Then, the CPU reads a data A from the sensor 801, and compares it with a reference position for the table to compute an amount of deviation of the table from the reference position. When not in use, the table on the air springs is normally in the lowermost position, and hence the CPU decides whether the position of the table is in a high-speed region or a low-speed region. When the table position is in the high-speed region, the inlet valve is actuated. The program is now back to the LOOP point. A data B from another sensor is then read and the foregoing process is repeated. Similarly, a data C from still another sensor is processed. Then, again, a data A is read. At this time, the result of the foregoing process is reviewed, and when the table enters the low-speed region, the inlet valve is de-energized, and then a single pulse for moving the table upwardly for a unit amount is generated. The width of such a pulse is determined by using the standard data. The foregoing cyclic process will be repeated to lift the table to the reference region.

When the table is in the reference region, the program decides whether the process for determining unit driven distances, that is, unit amounts of upward and downward movement, has been effected.

As the program proceeds beyond the SET point, combined upward and downward movement pulses A+ and A− as shown in FIG. 12 are generated only when the table is in the reference region, and it is determiend whether a unit distance for which the table is to be driven is correct or not. For example, where the table is lowered 35 μm with an upward movement pulse of 200 msec. and a downward movement pulse of 110 msec., and where a unit driven distance is set to be 30 μm, the width of the downward movement pulse is reduced by 1 msec. to measure an amount of displacement of the table again. When data on the combined widths of upward and downward movement pulses for attaining a unit driven distance are determiend, the standard data initially written in the RAM are re-written. Then, the unit driven distance is determined, preventing the program from entering the SET point.

Thereafter, each sensor is checked to ascertain whether the table is out of the reference region, and when the table is out of that region, as many upward or downward movement pulses as necessary are applied to return the table to the reference region. Since the foregoing processing is effected by a microcomputer at a speed much higher than the speed at which the air springs respond, the air springs can be regarded as being actuated substantially simultaneously for moving the table upwardly or downwardly.

Figure 17:
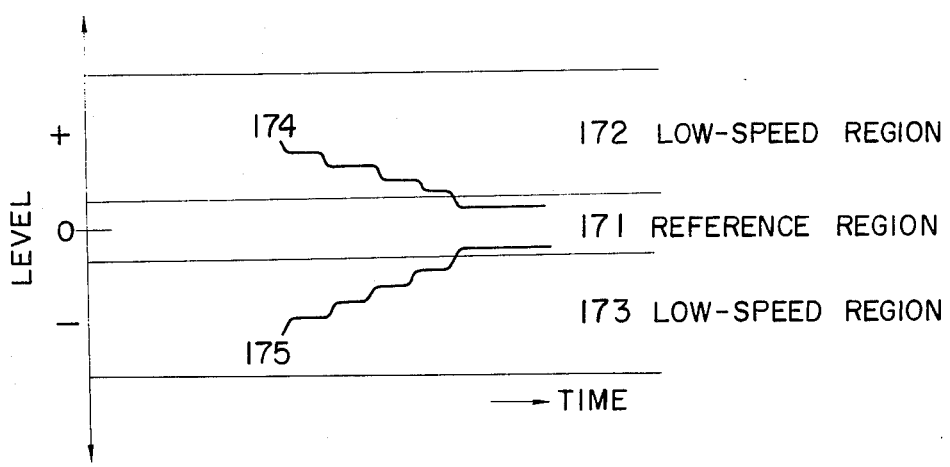
FIG. 17 is illustrative of table level variations as caused by a plurality of pulses for moving the table upwardly and downwardly.
Figure 18:
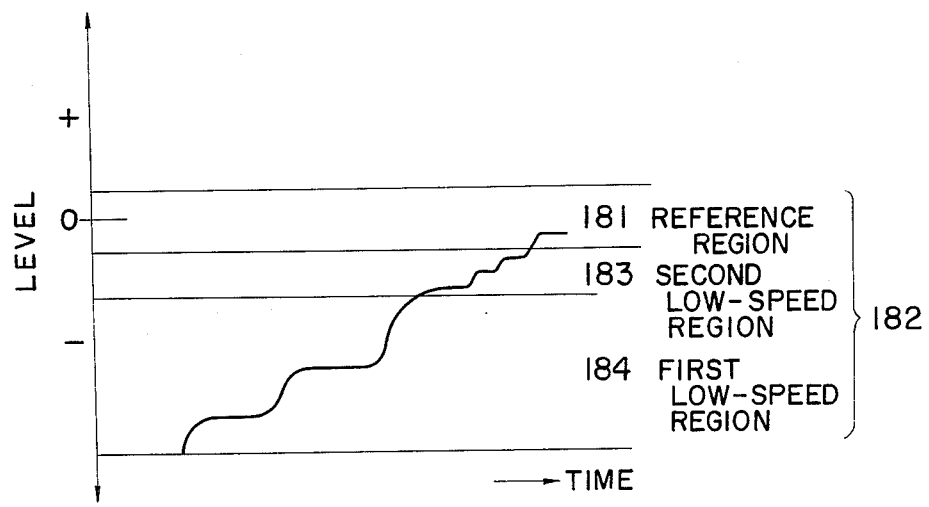
FIG. 18 shows table level variations in two divided low-speed regions.

In FIG. 17, the table is returned from a level 174 or 175 in either one of low-speed regions 170, 173 on both sides of a reference region 171 to the reference region through five increments of driven movement. FIG. 18 shows a reference region 181 and a low-speed region 182 disposed downwardly of the reference region 181 and including first and second low-speed regions 184, 183. The table will be moved for different unit distances in the first and second low-speed regions 184, 183. In FIG. 18, the table can be raised at a relatively high speed through the first low-speed region 184 up to the second low-speed region 183, which is smaller in width. Thus, the table can have an increased response as a whole.

Figure 19:
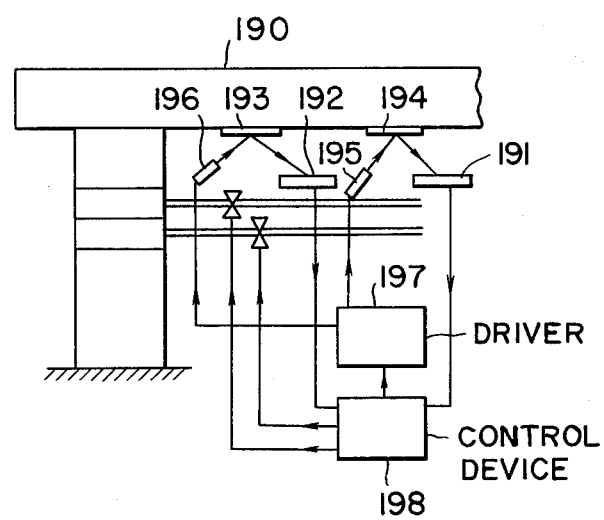
FIG. 19 illustrates a modified sensor.

A modified sensor, shown in FIG. 19, for use in a control method according to the present invention, serves to detect a table optically. A driver circuit 197 energizes light-emitting elements 195, 196 to emit light, which is reflected by mirrors 193, 194 attached to a lower surface of a table 190 and received by a two-dimensional image sensor 191 to detect the degree of inclination of the table 190. The two-dimensional image sensor delivers data on the degree by which the table 190 deviates from the horizon to a controller 198 in order to align the table 190 with the horizon. Light emitted from the light-emitting element 196 also falls on the mirror 193 on the table as held horizontally at an angle to the horizon and is reflected onto a one-dimensional image sensor 192 which can detect the level of the table based on a deviation of the position where light hits the sensor 192.

With the control method according to the present invention, the position of a table can be sensed to a nicety through contactless detection for returning the table to a reference position in much a shorter period of time than with conventional mechanical control arrangements. In addition, level control for self-levelling devices is effeced by a microcomputer under a relatively simple program.

The present invention is not limited to the foregoing illustrated embodiments, but should be interpreted to include various modications such as follows:

(i) The sensor may be replaced with a device for sensing an approaching object through contactless detection based on changes in electrostatic capacity.

(ii) The air spring may be of the suspension type.

(iii) The controller may be operable under different programs. For example, a device may be added under a command from the operator for setting unit driven distances for the table or displaying what is being processed.

(iv) Unit driven distances for which the table is to be moved upwardly and downwardly may be changed as desired.

Thus, there is provided in accordance with the invention a control method for the self-levelling device which has the advantage discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. A method of controlling the level of a self-levelling device including a table to be controlled to a predetermined level, an air spring supporting the table, a sensor for contactless detection of an amount of displacement of the table from a reference position, an inlet valve for supplying air under pressure to the air spring through an inlet port therein, and an outlet valve for discharging air from the air spring through an outlet port therein, said method comprising the steps of:

measuring an upward movement amount and a downward movement amount of the table which correspond to a predetermined period of time during which said inlet and outlet valves are actuated respectively while the self-levelling device is in operation;

storing in a controller, data on a width of electric pulse to energize the respective valve for moving said table upwardly or downwardly by unit distances on the basis of a relationship between each of said upward and downward movement amount of said table and said predetermined period of time; and actuating said inlet valve in response to intermittent application of pulses for moving said table upwardly through increments of unit distance or actuating said outlet valve in response to intermittent application of pulses for moving said table downwardly through increments of unit distance.

2. A method according to claim 1, wherein said steps of measuring and storing are effected only at the time of starting operation of the self-levelling device.

3. A method according to claim 1, said inlet valve and said outlet valve being actuated simultaneously or one after another with an interval of time therebetween after said inlet valve and said outlet valve has started being operated and before said table is actually raised or lowered.

4. A method of controlling the level of a self-levelling device including a table to be controlled to a predetermined level, an air spring supporting the table, a sensor for contactless detection of an amount of displacement of the table from a reference position, and inlet valve for supplying air under pressur to the air spring through an inlet port therein, and an outlet valve for discharging air from the air spring through an outlet port therein, said method comprising the steps of:

computing, from the amount by which the table is displaced, an interval of time for actuating said inlet valve and said outlet valve to return said table to the reference position;

actuating said inlet and said outlet valve for the calculated interval of time to adjust the table level through the air spring;

determining two or more speed regions for upward or downward movement of the table of the self-levelling device in response to an amount of deviation of said table from a reference position;

providing different unit distances for the respective upward and downward movements of said table in said regions, said unit distances for upward and downward movement being smaller for the speed regions which are closer to said reference position.

5. A method according to claim 4 wherein said inlet valve and said outlet valve are actuated simultaneously or one after another with an interval of time therebetween after said inlet valve and said outlet valve have started being operated and before said table is actually raised or lowered.

* * * * *